US009933115B2

(12) United States Patent
Rado et al.

(10) Patent No.: US 9,933,115 B2
(45) Date of Patent: Apr. 3, 2018

(54) SYSTEMS FOR FILLING A GAS CYLINDER

(71) Applicant: Scott Technologies, Inc., Boca Raton, FL (US)

(72) Inventors: Gordon E. Rado, Waxhaw, NC (US); Jay P. Phillips, Concord, NC (US)

(73) Assignee: Scott Technologies, Inc., Boca Raton, FL (US)

( * ) Notice: Subject to any disclaimer, the term of this patent is extended or adjusted under 35 U.S.C. 154(b) by 127 days.

(21) Appl. No.: 14/853,020

(22) Filed: Sep. 14, 2015

(65) Prior Publication Data

US 2016/0138759 A1 May 19, 2016

Related U.S. Application Data

(63) Continuation of application No. PCT/US2014/027060, filed on Mar. 14, 2014.
(Continued)

(51) Int. Cl.
*F16K 31/12* (2006.01)
*F17C 5/06* (2006.01)

(52) U.S. Cl.
CPC .......... *F17C 5/06* (2013.01); *F17C 2201/058* (2013.01); *F17C 2205/0323* (2013.01);
(Continued)

(58) Field of Classification Search
CPC .................... Y10T 137/7796; Y10T 137/7825
See application file for complete search history.

(56) References Cited

U.S. PATENT DOCUMENTS 2,328,007 A * 8/1943 Griswold ................ F16K 15/06 137/496
2,962,045 A * 11/1960 Christensen ............ F16K 17/10 137/505.13

(Continued)

FOREIGN PATENT DOCUMENTS

CN 87102179 A 9/1987
CN 1694087 A 11/2005
GB 668345 A 3/1952
GB 958985 A 5/1964

OTHER PUBLICATIONS

Australian Examination Report No. 1 for Standard Patent Application dated Nov. 28, 2017 issued in corresponding Australian Patent Application No. 2014240103, consisting of 3 pages.

*Primary Examiner* — R. K. Arundale
(74) *Attorney, Agent, or Firm* — Christopher & Weisberg, P.A.

(57) ABSTRACT

A flow control valve includes a housing defining a cavity therein. The housing has an input port for receiving a gas from a gas supply, and an output port for delivering the gas to a gas cylinder. The cavity defines a staging area fluidly connected to the input port, a delivery area fluidly connected to the output port, and a pressurization area fluidly connected to a feedback sensing port. The feedback sensing port is configured to receive pressurized fluid that is pressurized to a pressure level representative of a pressure level of gas delivered to the gas cylinder. The flow control valve includes a piston slidably positioned in a channel extending between the pressurization area and the delivery area. The position of the piston changes a rate of flow of gas through the flow control valve. The piston position moves in response to a pressure at the feedback sensing port.

6 Claims, 8 Drawing Sheets

Related U.S. Application Data

(60) Provisional application No. 61/787,331, filed on Mar. 15, 2013.

(52) U.S. Cl.
CPC ................. *F17C 2205/0385* (2013.01); *F17C 2205/0394* (2013.01); *F17C 2221/011* (2013.01); *F17C 2221/014* (2013.01); *F17C 2221/031* (2013.01); *F17C 2223/0123* (2013.01); *F17C 2223/036* (2013.01); *F17C 2227/0157* (2013.01); *F17C 2227/04* (2013.01); *F17C 2250/043* (2013.01); *F17C 2250/0434* (2013.01); *F17C 2260/02* (2013.01); *F17C 2260/023* (2013.01); *F17C 2260/025* (2013.01); *F17C 2270/025* (2013.01); *F17C 2270/079* (2013.01); *F17C 2270/0781* (2013.01); *Y10T 137/7797* (2015.04)

(56) References Cited

U.S. PATENT DOCUMENTS

| | | | | |
|---|---|---|---|---|
| 2,982,297 | A * | 5/1961 | Modes | G05D 16/0655 137/271 |
| 3,529,622 | A * | 9/1970 | Ligh | F16K 31/1266 137/329.02 |
| 4,252,145 | A | 2/1981 | Peters | |
| 5,381,816 | A * | 1/1995 | Alsobrooks | G05D 16/0636 123/463 |
| 6,240,943 | B1 | 6/2001 | Smith | |
| 8,375,983 | B2 | 2/2013 | Niebel | |
| 2003/0056830 | A1* | 3/2003 | Ye | G05D 16/2093 137/487.5 |
| 2007/0056633 | A1* | 3/2007 | Zimpfer | F15B 1/021 137/494 |
| 2010/0206401 | A1 | 8/2010 | Niebel | |

* cited by examiner

SYSTEMS FOR FILLING A GAS CYLINDER

CROSS-REFERENCE TO RELATED APPLICATIONS

This application is a continuation of International Patent Application No. PCT/US2014/027060 filed Mar. 14, 2014, which claims priority to and the benefit of the filing date of U.S. Provisional Application No. 61/787,331, filed on Mar. 15, 2013, the contents of both of which are incorporated herein by reference.

BACKGROUND OF THE INVENTION

The subject matter described herein relates generally to systems for filling a gas cylinder.

Current cylinder filling products require the operator of the equipment to manually adjust a restrictor valve to control the rate at which air is transferred into a cylinder for storing a gas, such as a self-contained breathing apparatus (SCBA) or self-contained underwater breathing apparatus (SCUBA) cylinder. If the cylinder(s) are filled too rapidly, the air heats up to such a degree that expansion of the air creates a condition causing the cylinder to be less than completely filled when the air subsequently cools down. Additionally, when the cylinder is filled too slowly this creates an inefficient use of the operator's time. The filling process may be dependent on the skill level of the operator experience as the valve may require continuous adjustment to achieve an optimal filling rate.

In order to help achieve the optimum fill rate known cylinder filling products may include an automatic flow control valve. For example, FIG. 1 illustrates a currently known automatic flow control valve 45. The automatic flow control valve 45 may incorporate a needle valve 50 controlled through a spring 52 and a piston 54 that is acted upon by storage pressure. As such, when the storage pressure is high, the needle valve 50 closes to restrict the gas flow rate through the automatic flow control valve 45. However, the gas flow rate may be controlled in proportion to storage pressure. This may be disadvantageous in that the needle valve may remain at its most restricted position if the storage pressure remains high, even as the pressure in the cylinder being filled increases resulting. The restricted positioning of the needle valve may result in a steadily decreasing gas flow rate. Other known systems utilize a manual control to control the gas flow rate. FIGS. 2A and 2B illustrate a schematic of a known gas cylinder filing system with manual control. As shown in FIGS. 2A and 2B, the cylinder filling system utilizes a manually operated control valve 56 to control the amount of pressure delivered to one or more cylinders 58 from a compressor 60.

BRIEF DESCRIPTION

In an embodiment, a flow control valve is provided. The flow control valve includes a housing defining a cavity therein. The housing has an input port for receiving a gas from a gas supply, and an output port for delivering the gas to a gas cylinder. The cavity defines a staging area fluidly connected to the input port, a delivery area fluidly connected to the output port, and a pressurization area fluidly connected to a feedback sensing port. The feedback sensing port is configured to receive pressurized fluid that is pressurized to a pressure level representative of a pressure level of gas delivered to the gas cylinder. The flow control valve also includes a piston slidably positioned in a channel extending between the pressurization area and the delivery area. The position of the piston changes a rate of flow of gas through the flow control valve. The piston position moves in response to a pressure at the feedback sensing port.

In certain embodiments, the flow control valve includes an aperture situated between the delivery area and the staging area. The piston includes a needle valve that extends through the aperture. The needle valve controls the flow of gas through the aperture.

In certain embodiments, the needle includes a tapered portion having a varying diameter such that a diameter at an end of the needle is slightly less than a diameter of the aperture.

In certain embodiments, the tapered region restricts the flow of gas through the aperture when the piston is in a minimum flow position.

In certain embodiments, the flow control valve includes an adjusting screw and a control spring. The control spring engages a flange on the piston at a proximal end and engages the adjusting screw at a distal end. The adjusting screw is configured to exert a bias force on the flange.

In certain embodiments, the flow control valve includes a pressure check assembly configured to maintain a greater pressure in the staging area than the pressurization area.

In certain embodiments, the pressure check assembly includes a pin and a return spring. The pin and return spring extend through a cavity in the piston. The return spring is configured to extend based on a pressure in the feedback sensing port.

In certain embodiments, the input port, the output port, and the sensing are located at a proximal end of the flow control valve.

In certain embodiments, the housing includes a threaded portion configured to be mated to a port on a pneumatic control manifold.

In certain embodiments, the position of the piston is based on a pressure difference between a pressure in the staging area and the pressurization area.

In an embodiment, a charging system is provided. The charging system includes a storage cylinder configured to supply gas. The charging system also includes a gas cylinder configure to store gas. The charging system also includes a pneumatic control manifold configured to receive a flow control valve. The flow control valve includes a housing defining a cavity therein. The housing has an input port for receiving a gas from a gas supply, and an output port for delivering the gas to a gas cylinder. The cavity defines a staging area fluidly connected to the input port, a delivery area fluidly connected to the output port, and a pressurization area fluidly connected to a feedback sensing port. The feedback sensing port is configured to receive pressurized fluid that is pressurized to a pressure level representative of a pressure level of gas delivered to the gas cylinder. The flow control valve also includes a piston slidably positioned in a channel extending between the pressurization area and the delivery area. The position of the piston changes a rate of flow of gas through the flow control valve. The piston position moves in response to a pressure at the feedback sensing port.

In certain embodiments, the flow control valve includes an aperture situated between the delivery area and the staging area. The piston includes a needle valve that extends through the aperture. The needle valve controls the flow of gas through the aperture.

In certain embodiments, the needle includes a tapered portion having a varying diameter such that a diameter at an end of the needle is slightly less than a diameter of the aperture.

In certain embodiments, the tapered region greatly restricts the flow of gas through the aperture when the piston is in a minimum flow position.

In certain embodiments, the flow control valve includes an adjusting screw and a control spring. The control spring engages a flange on the piston at a proximal end and engages the adjusting screw at a distal end. The adjusting screw is configured to exert a bias force on the flange.

In certain embodiments, the flow control valve includes a pressure check assembly configured to maintain a greater pressure in the staging area than the pressurization area.

In certain embodiments, the pressure check assembly includes a pin and a return spring. The pin and return spring extend through a cavity in the piston. The return spring is configured to extend based on a pressure in the feedback sensing port.

In certain embodiments, the input port, the output port, and the sensing are located at a proximal end of the flow control valve.

In certain embodiments, the housing includes a threaded portion configured to be mated to a port on a pneumatic control manifold.

In certain embodiments, the position of the piston is based on a pressure difference between a pressure in the staging area and the pressurization area.

BRIEF DESCRIPTION OF THE DRAWINGS

FIG. 3A is a system diagram of a gas cylinder filling system formed in accordance with an embodiment herein.

DETAILED DESCRIPTION

Figure 1:
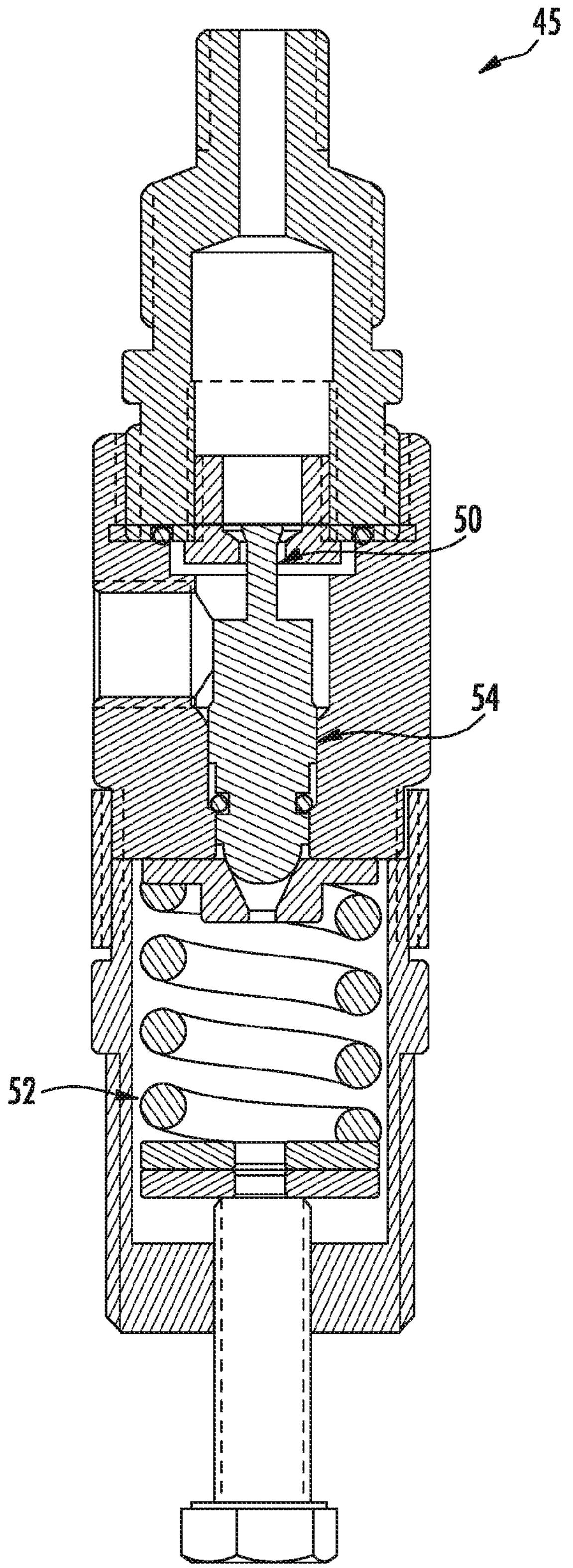
FIG. 1 (PRIOR ART)
FIG. 1 illustrates a currently known automatic flow control valve.
Figure 2A:
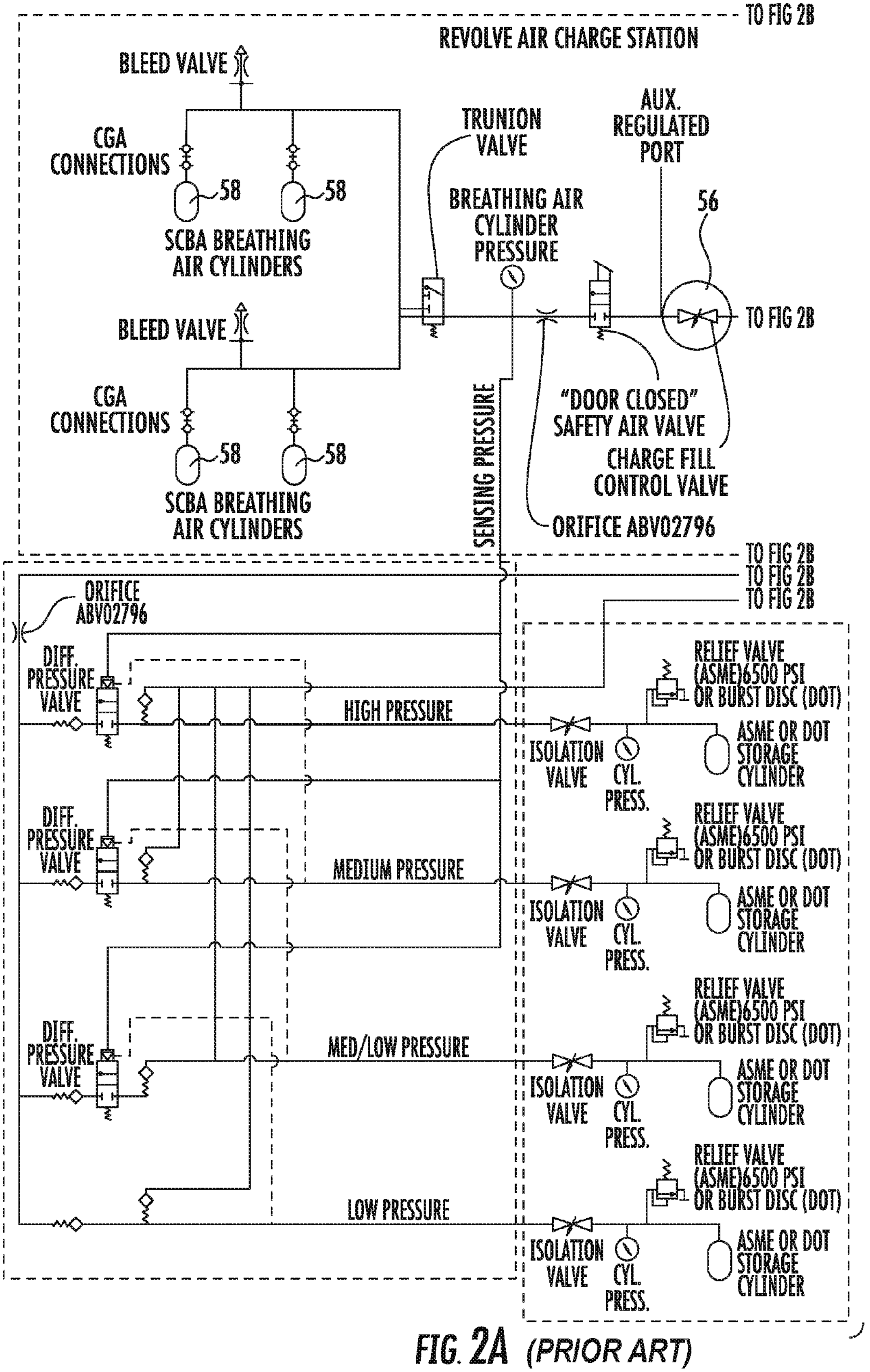
FIG. 2A (PRIOR ART)
FIGS. 2A and 2B are a schematic of a known gas cylinder filling system with manual control.
Figure 2B:
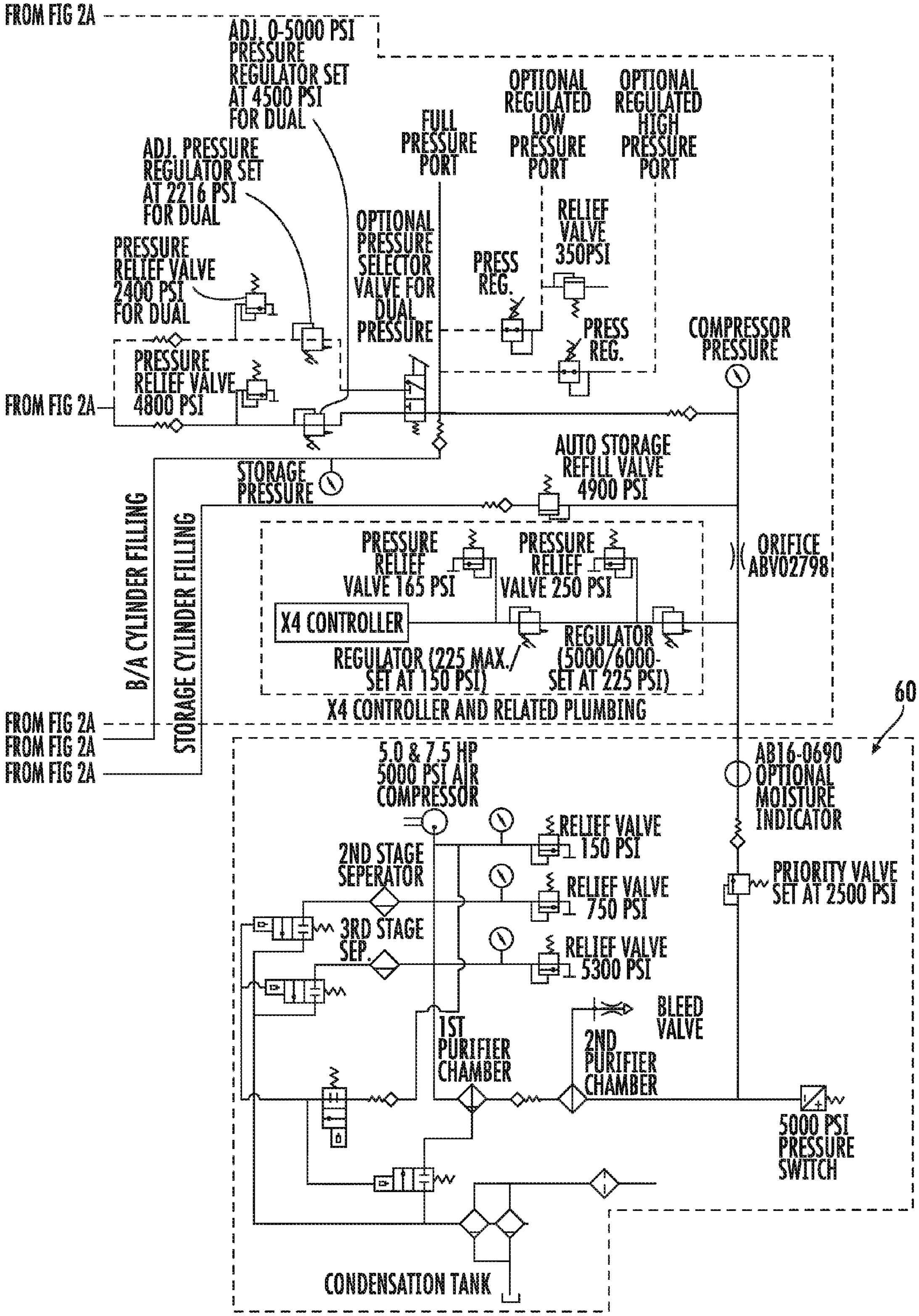
FIG. 2B (PRIOR ART)

The subject matter described herein relates to cylinder filling devices, and more specifically to systems for filling self-contained breathing apparatus (SCBA) gas cylinders. The subject matter herein describes a flow rate control valve that controls gas flow rate in proportion to a storage pressure, and in proportion to a pressure in a cylinder being filled allowing the gas flow rate to depend on a pressure difference between the storage pressure and the cylinder pressure.

FIG. 3A is a system diagram of a gas cylinder filling system 110. The gas cylinder filling system 110 includes a charging station 112 configured to fill a gas cylinder 24 with gas from a gas supply, such as a storage cylinder 22. In the illustrated embodiment, the storage cylinder 22 is shown as a gas tank. However, the storage cylinder 22 may any source of gas, such as, for example, a compressor. The gas may be any gas, such as, but not limited to, a breathing gas (such as, but not limited to, air, oxygen, nitrogen, and/or the like) and/or the like. The gas cylinder 24 may be any type of gas cylinder, such as, but not limited to, a gas cylinder for a self-contained breathing apparatus (SCBA) for fire fighters and first responders, a space suit, medical equipment, a self-contained underwater breathing apparatus (SCUBA), or the like. Although shown as generally cylindrical in shape, in addition or alternatively to the cylindrical shape, the gas cylinder 24 may include any other shape(s).

The charge station 112 includes a flow control valve 100 configured to govern the flow of gas from the storage cylinder 22 to the gas cylinder 24 as the charge station 112 fills the gas cylinder 24. The flow control valve 100 is fluidly coupled to the storage cylinder 22 via a supply line 120. For example, the supply line 120 may be coupled to a valve 122 on the storage cylinder 22, and coupled to an input port 124 on the flow control valve 100. The flow control valve 100 is also fluidly coupled to the gas cylinder 24 via a delivery line 126. For example, the delivery line 126 may be coupled to an output port 128 on the flow control valve 100, and coupled to a valve 130 on the gas cylinder 24. For example, the valve 130 may be a pillar valve on a tank. The valve 130 is also coupled to a pressure feedback sensing port 132 on the flow control valve 100 via a pressure return line 134. For example, the valve 130 may be configured to provide pressure in the return line 134 representative of a pressure level in the gas cylinder 24. The lines 120, 126, and 134 may be any suitable connection means, such as, for example, pressurized tubing. In various embodiments, the charge station 112 may include supporting components interposed between the lines 120, 126, and the control valve 100, such as, for example, bleed valves, regulators, relief valves, boost pumps and/or compressors, pressure gauges, and/or the like.

The ports 124, 128, and 132, may be selectively pressurized. For example, the port 124 may be pressurized to a pressure P1. The pressure P1 may represent a pressure level downstream of the storage cylinder 22 in the line 120. The feedback sensing port 132 receives pressurized fluid that is pressurized to a pressure level P2. The pressure P2 may represent a feedback or sensing pressure level representative of the pressure entering the valve 130. The pressure P2 is concurrently varied in real-time with the pressure P1. In other words, the pressure P2 is dynamically varied in common with the pressure P1 based on the pressure in the cylinder 24. Accordingly, the pressure P2 provides a fluid feedback loop to allow the flow control valve 100 to pneumatically control the gas flow rate without requiring electronic sensing means or electronic control systems.

The port 128 may be pressurized to a pressure P3. The pressure P3 may represent a delivery pressure level indicative of the pressure being supplied to the valve 130. The pressure P3 may be simultaneously varied based on the pressures P1 and P2.

The flow control valve 100 includes an adjusting screw 34 configured to control the gas flow rate through the flow control valve 100. As is discussed below, the flow control valve 100 includes a feedback mechanism to maintain a substantially constant gas flow rate through the flow control valve 100.

In operation, when the gas cylinder 24 is desired to be filled, the gas cylinder 24 may be fluidly connected to the output port 128 and the pressure feedback sensing port 132 of the flow control valve 100. The adjusting screw 34 may then be adjusted to set the flow rate of gas from the storage cylinder 22 being delivered to the gas cylinder 24. Once initially set, the flow control valve 100 automatically and continually adjusts the rate of flow of gas delivered to the gas cylinder 24 such that a substantially linear gas flow rate may be achieved. The adjusting screw 34 may then be locked with a fastener (e.g., a nut) to prevent further adjustment. Accordingly, an operator need not continually adjust the adjusting screw 34 while the gas cylinder 24 is being filled. Although one flow control valve 100 and one gas cylinder 24 are shown, the charge station 112 may include any number of storage cylinders 22 and any number of flow control valves 100, for example, for concurrently filling any number of gas cylinders 24.

Figure 3B:
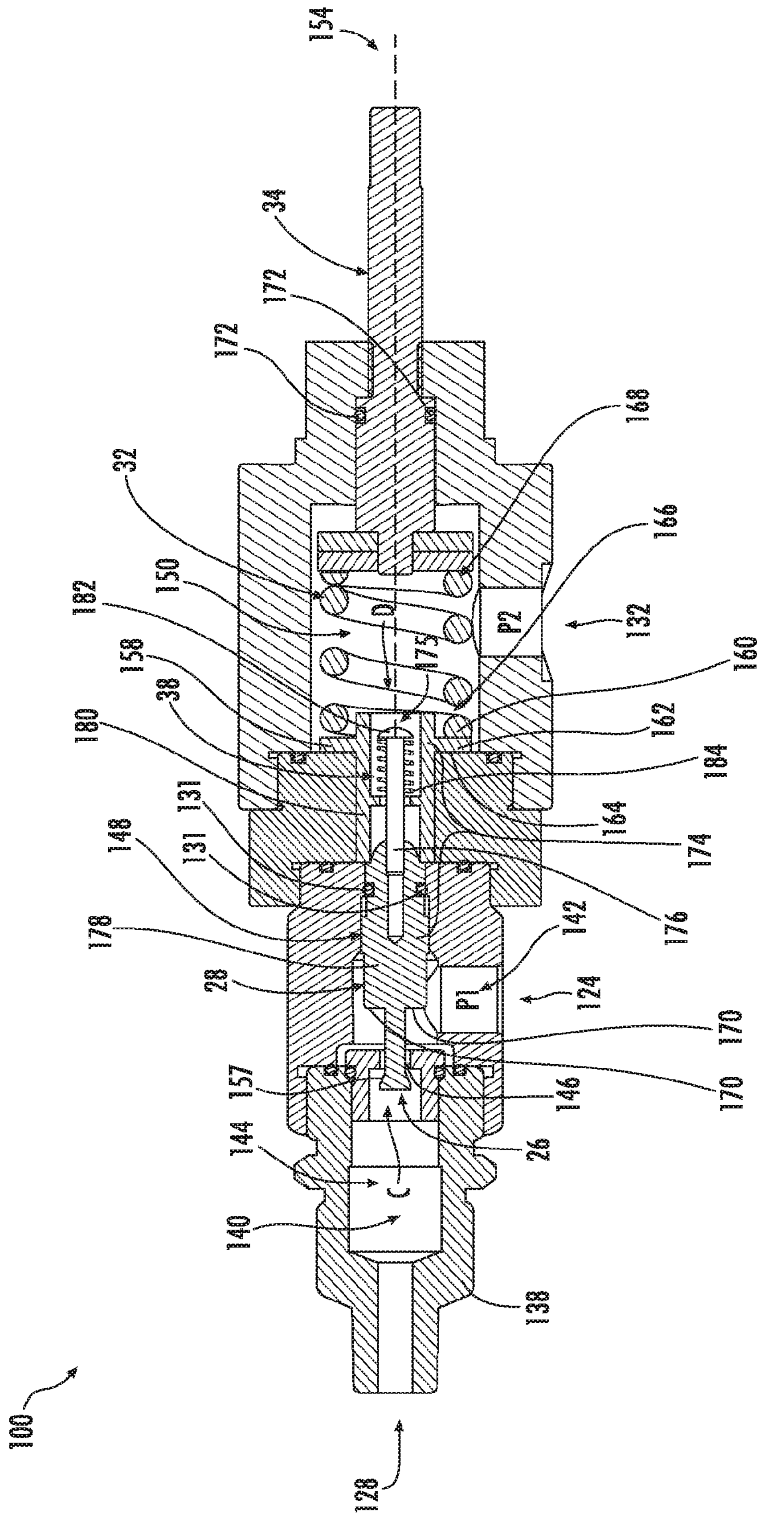
FIG. 3B illustrates a cross-sectional view of a flow control valve formed in accordance with an embodiment herein.
Figure 5:
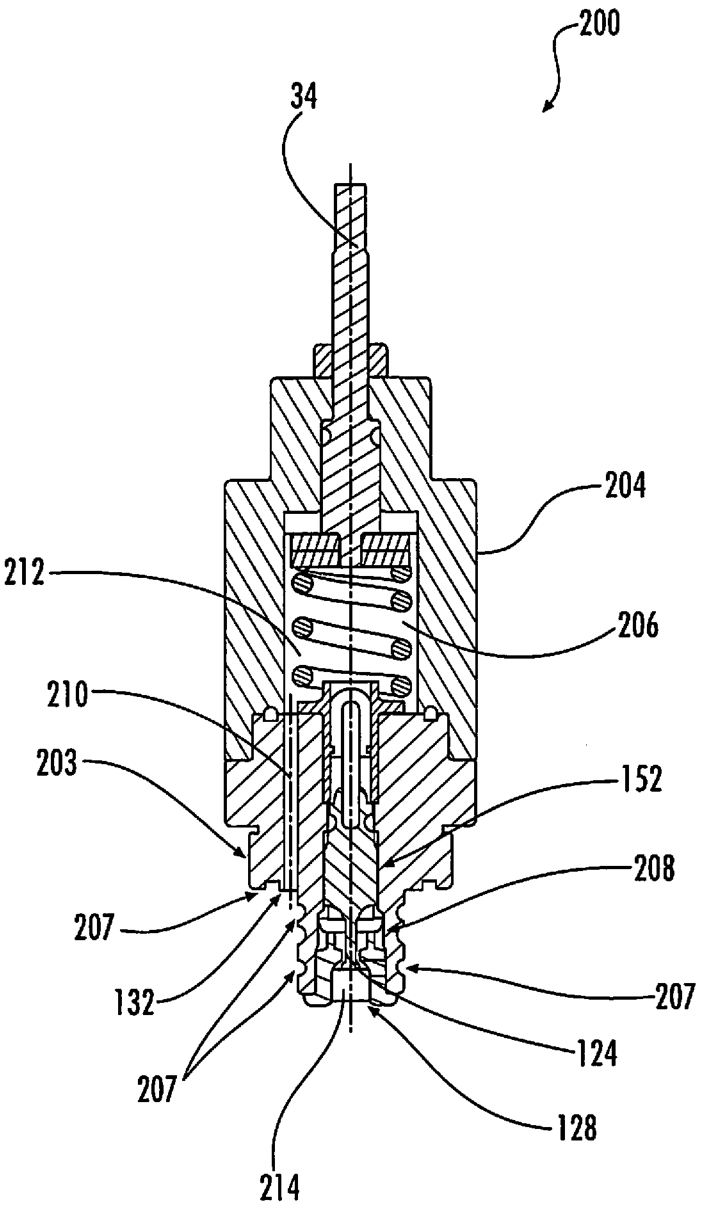
FIG. 5 illustrates a cross-sectional view of a flow control valve configured as a cartridge formed in accordance with an embodiment herein.
Figure 6:
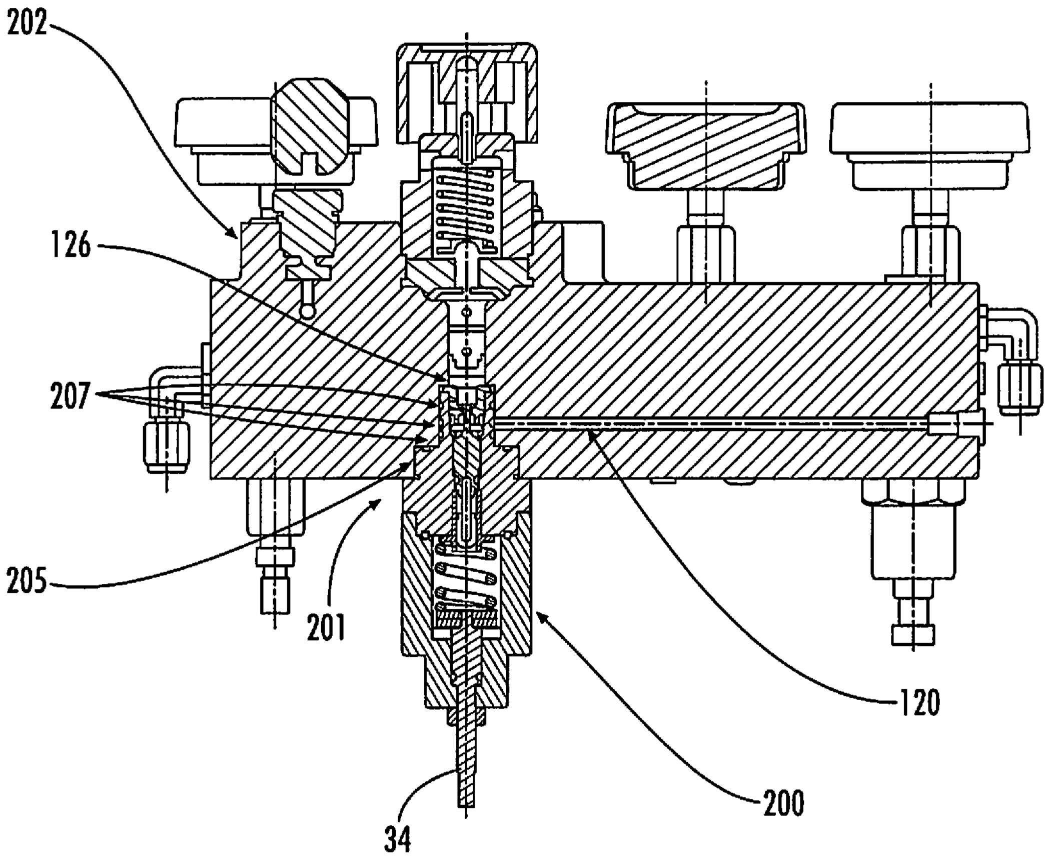
FIG. 6 illustrates a cross-sectional view of a flow control valve configured as a cartridge installed in a pneumatic control manifold formed in accordance with an embodiment herein.

FIG. 3B illustrates a cross-sectional view of the flow control valve 100 shown in FIG. 3A. In the illustrated embodiment, the flow control valve 100 may be a stand-alone or "free hand" type such that the flow control valve 100 may be directly connected to pressure lines. However, in other embodiments, other arrangements are possible. For example, FIGS. 5 and 6 illustrate a cartridge type flow control valve that may be mounted to a manifold.

The flow control valve 100 includes a housing 138 having a multi-chamber cavity 140 therein that extends along at least a portion of the length of the housing 138. For example, the cavity 140 may be formed from a pressurization area 150, a channel 148, a staging area 142, and a delivery area 144. The housing 138 holds the adjusting screw 34 such that the adjusting screw 34 may travel in and out of the cavity 140. For example, the housing 138 may include threads (not shown) configured to hold the adjusting screw 34 such that the adjusting screw 34 enters the cavity 140 when the adjusting screw 34 is tightened, and extends out of the cavity 140 when the adjusting screw 34 is loosened. As another example, the housing 138 may provide a friction fit between the housing 138 and the adjusting screw 34.

The adjusting screw 34 allows for biasing the preload of a control spring 32 in order to control or tune the flow through the flow control valve 100. The adjusting screw 34 preferably has an O-ring 172 to provide a seal to keep gas from leaking out of the automatic flow control valve 100.

The housing 138 includes various openings. A first opening may define the input port 124, a second opening may define the output port 128, and a third opening may define the pressure feedback sensing port 132. The ports 124, 128, and 132 fluidly coupled to the cavity 140. For example, the input port 124 may open to the cavity 140 such that gas may be delivered to the cavity 140 through the input port 124.

The cavity 140 includes the staging area 142 and the delivery area 144 separated by an aperture 146 (e.g., an orifice). The staging area 142 is configured to receive gas from the storage cylinder 22 through the input port 124. The delivery area 144 is configured to deliver gas to the output port 128. The cavity 140 also includes the channel 148 situated between the delivery area 144 and a pressurization area 150. The pressurization area 150 is configured to receive gas from the pressure feedback sensing port 132.

The flow control valve 100 includes a piston 28 slidably situated within the channel 148 such that the piston 28 may move along a longitudinal axis 154 within the channel 148. As is discussed below, the position of the piston 28 within the channel 148 governs the gas flow rate through the flow control valve 100. The piston 28 includes a needle valve 26 at a distal end and a flange 158 at a proximal end. The flange includes an outer surface 160 and an inner surface 162. The inner surface 162 may abut against an interior surface 164 in the pressurization area 150 to limit the movement of the piston 28 in a direction D.

The control spring 32 is situated in the pressurization area 150. The control spring 32 abuts against the outer surface 160 of the flange 158 at a first, proximal end 166 and the adjusting screw 34 at a second, distal end 168. The control spring 32 may be a compression spring such that the control spring 32 is caused to be compressed when the adjusting screw 34 is screwed into the housing 138. When compressed the control spring 32 exerts a bias force on the flange 158 causing the piston 28 to move in the direction D.

The piston 28 includes the needle valve 26 at the distal end. The needle valve 26 is configured to extend through the aperture 146. The needle valve 26 may be selectively sized and shaped to control the gas flow rate through the aperture 146. For example, the needle valve 26 may include a tapered portion 157 having a varying diameter such that a diameter at a distal end of the needle valve 26 is greater than a diameter of the aperture 146. The diameter of the needle valve 26 at the proximal end is slightly less than the diameter of the aperture 146. As such, proximal end of the needle valve 26 may extend through the aperture 146. In the illustrated embodiment, the needle valve 26 includes a single taper angle, however, in other embodiments, the needle valve 26 may include other appropriate shapes, such as without limitation a curved profile or a stepped taper.

The needle valve 26 may govern the gas flow rate through the flow control valve 100. The needle valve 26 may move within the aperture 146 as the piston 28 moves within the channel 148. When the flange 158 is abutted against the interior surface 164, the needle valve 26 allows gas to flow from the staging area 142 to the delivery area 144. In this position, the piston 28 is defined as in an "open" position. When the piston 28 is caused to move in a direction C, the tapered region 157 of the needle valve 26 may gradually travel into the aperture 146 substantially reducing the flow area between the staging area 142 and the delivery area 144. In this position, the piston 28 is defined in a "minimum flow" position. As such, tapered region 157 greatly restricts the flow of gas from input port 124 to the output port 128 when the piston 28 is in the minimum flow position. In other words, the needle valve 26 greatly restricts gas flow through the aperture 146 when in the minimum flow position. Additionally or optionally, the piston 28 and/or the needle valve 26 may include one or more piston sealing O-rings 131 configured to limit the amount of gas that may be transfer between the staging area 142, the delivery area 144, and/or the pressurization area 150.

The movement of the piston 28 may be based on the amount of pressure in the staging area 142 and the pressurization area 150. The staging area 142 has a storage pressure P1 therein. The storage pressure P1 may be based on the pressure from or within the storage cylinder 22 (shown in FIG. 3A). The storage pressure P1 applies on shoulder areas 170 of the piston 28 creating a force that pushes the piston 28 in the direction C. The force created by the storage pressure P1 is countered by the control spring 32 and a feedback sensing pressure P2 in the pressurization area 150. The feedback sensing pressure P2 applies on the projected area of the piston 28 creating a force in the direction D.

In operation, as the cylinder 24 fills with gas, pressure in the return line 134 (shown in FIG. 3A) and the feedback sensing pressure P2 increases. The feedback sensing pressure P2 acting against the piston 28 gradually counteracts the force caused by the storage pressure P1 on the other end of the piston 28 allowing the spring force of the control spring 32 to displace the piston 28 and needle valve 26 in the direction D. Displacement of the piston 28 in the direction D increases the gas flow rate through the aperture 146 by increasing the effective flow area through the aperture 146. By continuously varying the position of the piston 28 and the needle valve 26, the flow control valve 100 maintains the gas flow rate at a substantially constant value. For example, as the pressure P2 increases, the piston 28 moves in the direction D to increase the flow rate through the aperture 146. The adjusting screw 34 allows a preload on the control spring 32 to be varied so that a desired flow rate for can be achieved by increasing or decreasing the bias force on the piston 28.

For example, when the charge station 112 begins filling the cylinder 24, the feedback sensing pressure P2 will be lower compared to the pressure P1 representative of pressure of the storage cylinder 22. As such, the pressure difference will cause the piston 28 to move in the direction C to limit the gas flow rate through the aperture 146. As the pressure in the cylinder 24 increases, the sensed pressure P2 increases, reducing the pressure difference between the sensed pressure P1 and P1. Accordingly the piston 28 is driven to the open position by the control spring 32. Proper shaping of the needle valve 26 can cause the air flow to be held relatively constant over a wide range of changes in both storage and SCBA pressures.

Optionally, in various embodiments, the piston 28 may include a cavity 175 and a pressure check assembly 174 housed therein. The pressure check assembly 174 is configured to maintain a greater pressure in the staging area 124 than the pressurization area 150. The pressure check assembly 174 includes a pin 176 and a return spring 38. The piston 28 may include a forward portion 178 and a separate aft portion 180. The pin 176 extends from the forward portion 178 and extends into the cavity 175. The return spring 38 is situated between a flanged portion 182 of the pin and an interior wall 184 of the cavity 175. The return spring 38 extends coaxially along a length of the pin 176. The pin 176 may be configured to secure the forward portion 178 to the aft portion 180. For example, the pin 176 may be a threaded fastener, such as a screw.

The return spring 38 may be configured as a "light" spring (e.g., having a relative low spring constant compared to the control spring 32). The return spring 28 may be configured to extending based on the feedback sensing pressure P2. The return spring 38 may act as a check valve to prevent gas flow from the pressurization area 150 past piston 28 when the storage pressure P1 is greater than the feedback sensing pressure P2. In other words, the return spring 38 extends to move the forward portion 178 of the piston 28 towards the surface of the aft portion 180 seating the piston sealing O-ring 131 in the channel 148 when the pressure P1 (from the storage cylinder 22) is greater than the feedback sensing pressure P2 (from the cylinder 24). Conversely, when the sensing pressure P2 is greater than the storage pressure P1, the pressure differential acting on the piston 28 will overcome the spring force of the return spring 38 causing the piston 28 to travel in the direction D until the piston sealing O-rings 131 disengages from the wall of the channel 148. Accordingly, gas may flow past the piston 28 until the pressure P1 and pressure P2 equalize. Once the pressures equalize, the piston sealing O-rings 131 will reengage with the channel 148. A check valve between the automatic flow control valve 100 and the storage cylinder 22 prevents gas in the cylinder 24 from emptying into the storage cylinder 22.

Figure 4A:
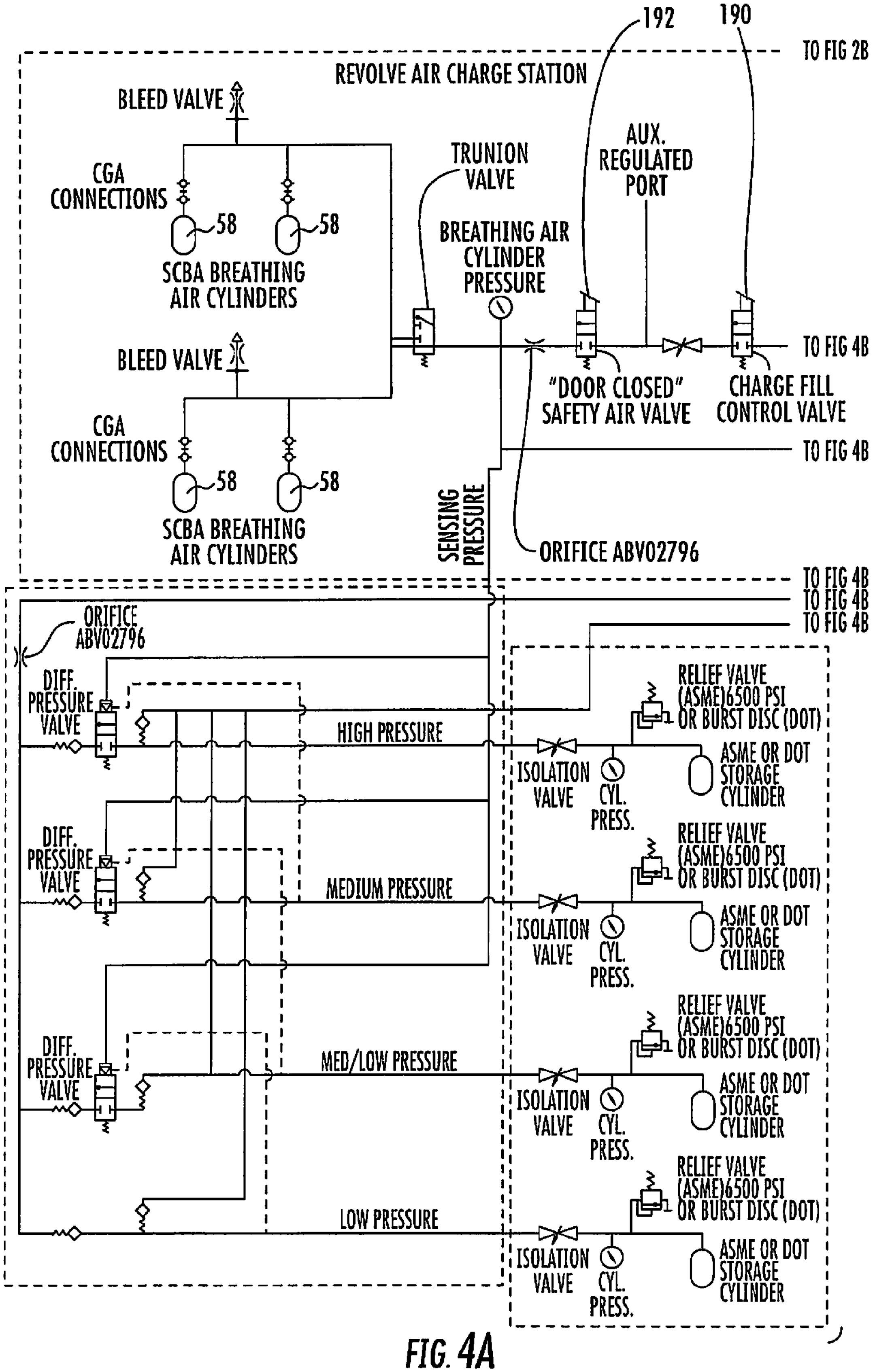
FIGS. 4A and 4B are schematics of a gas filling system having a flow control valve formed in accordance with an embodiment herein.
Figure 4B:
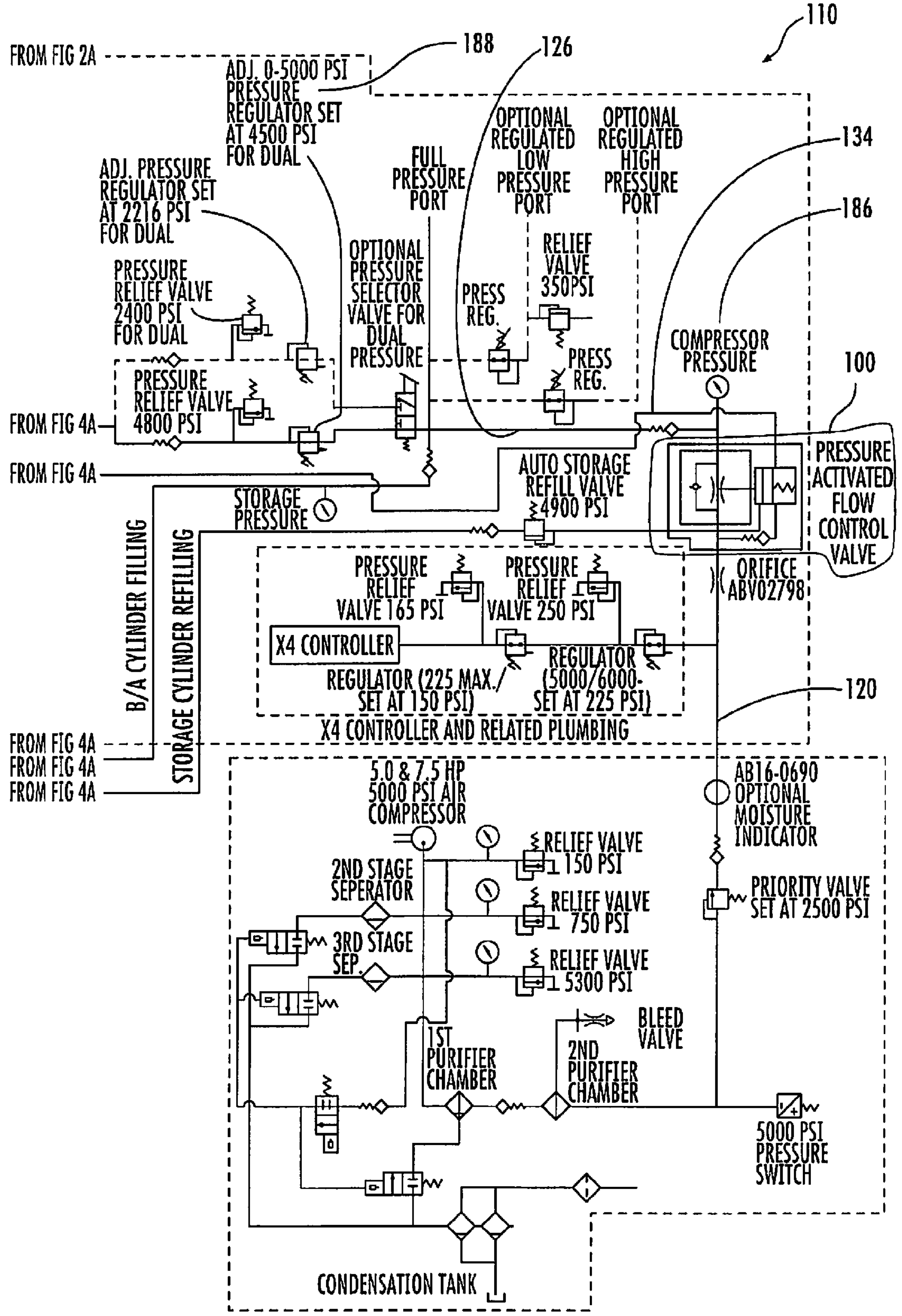

FIGS. 4A and 4B are schematics of a gas cylinder filling system 110 having the flow control valve 100. The flow control valve 100 is fluidly coupled to the supply line 120. In the illustrated embodiment, the supply line 120 includes a bypass to a pressure gauge 186 configured to measure the pressure P1 (shown in FIGS. 3A and 3B). The flow control valve 100 is also fluidly coupled to the return line 134. The flow control valve 100 is also fluidly coupled to the delivery line 126. In the illustrated embodiment, the delivery line 126 includes a pressure regulator 188 and control valve 190, a safety valve 192, among other components.

FIG. 5 illustrates a cross-sectional view a flow control valve configured as a cartridge 200 formed in accordance with an embodiment. FIG. 6, with continued reference to FIG. 5, illustrates a cross-sectional view of the cartridge 200 installed in a pneumatic control manifold (PCM) 202. The cartridge 200 and the PCM 202 may be used in addition to, or in place of, the flow control valve 100 in the charge station 112 (shown in FIG. 3A). As shown in the illustrated embodiments, lines 122, 126, and 134 and the ports 124, 128, 132 are substantially located at a proximal end of the cartridge 200. In this manner, the cartridge 200 may be installed in a port 201 in the PCM 202 such that interference of the lines 122, 126, and 134 may be substantially reduced or eliminated. Accordingly, a plurality of PCMs 202 may be placed adjacent to one another to concurrently service a plurality of cylinders 24.

The cartridge 200 includes a housing 204 defining a cavity 206 therein. The housing 204 may include a threaded portion 203 configured to threadably engage complementary threads 205 in the port 201 to secure the cartridge 200 to the PCM 202. In other embodiments, other securing means may be used, such as, a friction fit or a snap fit. The housing 204 may include O-rings 207 to provide a hermetic seal between the ports 124, 128, 132, on the cartridge 200 and the port 201 on the PCM 202.

Portions of the cavity 206 may be pressurized. The cavity 206 includes a staging area 208 opening to the input port 124 on the housing 204. The input port 124 is fluidly coupled to the supply line 120 (shown in FIG. 6). The staging area 208 may be pressurized to the pressure P1 by gas delivered through supply line 120. The housing 204 includes a duct 210 configured to fluidly couple the pressure feedback sensing port 132 to a pressurization area 212. The pressure feedback sensing port 132 is fluidly coupled to the return line 134. The feedback sensing port 132, duct 210, and the pressurization area 212 may be pressurized to the pressure P2. The cavity 206 includes a delivery area 214 fluidly coupled to the output port 128. As discussed above in relation to FIG. 3B, pressure differences between the staging area 208 and the pressurization area 212 govern the position of the piston 28, and accordingly, regulate the gas flow rate through the cartridge 200.

A technical effect of embodiments described herein include increased efficiency in filling a cylinder with a gas. A technical effect of embodiments described herein include reduced reliance on operator skill in filling a cylinder with a gas.

The automatic flow control valve may eliminate the need for manual adjustment and monitoring by the equipment operator and provides a constant flow rate into SCBA or SCUBA cylinder(s), because it continuously adjusts the needle valve opening in response to the differential pressure between the storage cylinder(s) and the cylinder(s) being filled.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions, types of materials and coatings described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

What is claimed is:

1. A flow control valve (FCV) comprising: a housing defining a cavity therein, the housing having an input port for receiving a gas from a gas supply, and an output port for delivering the gas to a gas cylinder; the cavity defining a staging area fluidly connected to the input port, a delivery area fluidly connected to the output port, and a pressurization area fluidly connected to a feedback sensing port, the feedback sensing port receiving pressurized fluid that is pressurized to a pressure level representative of the pressure level of gas delivered to the gas cylinder; a piston slidably positioned in a channel extending between the pressurization area and the delivery area, a position of the piston changing a rate of flow of gas through the flow control valve, the piston position moving in response to a pressure at the feedback sensing port; and an aperture located between the delivery area and the staging area, the piston further comprising a needle valve extending through the aperture, the needle valve controlling the flow of gas through the aperture.

2. The flow control valve of claim 1, wherein the needle valve includes a tapered portion having a varying diameter such that a diameter at an end of the needle valve is slightly less than a diameter of the aperture.

3. The flow control valve of claim 2, wherein the tapered portion restricts the gas flow through the aperture when the piston is in a minimum flow position.

4. The flow control valve of claim 1, further comprising an adjusting screw and a control spring, the control spring engaging a flange on the piston at a proximal end and engaging the adjusting screw at a distal end, the adjusting screw exerting a bias force on the flange.

5. A flow control valve (FCV) comprising a housing defining a cavity therein, the housing having an input port for receiving a gas from a gas supply, and an output port for delivering the gas to a gas cylinder; the cavity defining a staging area fluidly connected to the input port, a delivery area fluidly connected to the output port, and a pressurization area fluidly connected to a feedback sensing port, the feedback sensing port receiving pressurized fluid that is pressurized to a pressure level representative of the pressure level of gas delivered to the gas cylinder; a piston slidably positioned in a channel extending between the pressurization area and the delivery area, a position of the piston changing a rate of flow of gas through the flow control valve, the piston position moving in response to a pressure at the feedback sensing port; and a pressure check assembly maintaining a greater pressure in the staging area than in the pressurization area.

6. The flow control valve of claim 5, wherein the pressure check assembly includes a pin and a return spring; the pin and return spring extending through a cavity in the piston; the return spring extending based on a pressure in the feedback sensing port.

* * * * *